United States Patent [19]
Sokolean

[11] Patent Number: 5,930,962
[45] Date of Patent: Aug. 3, 1999

[54] CEILING ELEMENT FOR A HEATING AND COOLING CEILING

[75] Inventor: Helmuth Sokolean, Uerikon, Switzerland

[73] Assignee: Barcol-Air AG, Stafa, Switzerland

[21] Appl. No.: 08/368,993

[22] Filed: Jan. 5, 1995

[30] Foreign Application Priority Data

Jan. 5, 1994 [CH] Switzerland .................. 00 016/94
Sep. 27, 1994 [CH] Switzerland .................. 02 922/94

[51] Int. Cl.$^6$ ..................................... E04C 2/52
[52] U.S. Cl. .................. 52/220.1; 52/506.01; 165/49; 165/56; 165/171
[58] Field of Search .............. 52/506.01, 506.02, 52/506.03, 506.05, 506.08, 302.1, 533, 489.1, 220.1, 220.3, 220.6; 137/340; 165/56, 49, 171

[56] References Cited

U.S. PATENT DOCUMENTS 4,766,951  8/1988  Bergh ..................... 165/56
5,042,570  8/1991  Schmitt-Raiser et al. ...... 165/49 X

*Primary Examiner*—Creighton Smith
*Attorney, Agent, or Firm*—Pillsbury Madison & Sutro LLP

[57] ABSTRACT

In order to simplify and lower the costs of production and to facilitate installation and assembly, aluminum ceiling elements, for channelling the heat-transfer medium, each include a hose, preferably made of polyurethane, which, for the purpose of ensuring good heat transfer, is clamped between two parallel contact walls, which are respectively formed, for example, by a surface strip of a ceiling panel and the underside of a guide plate, with the result that the hose presses elastically against the two contact walls with a large part of its outer peripheral surface. The clamping action can be assisted by providing a slight super-atmospheric pressure in the heat transfer medium. A slit, through which the hose can be drawn into the groove, is left between the border of the guide plate and the ceiling panel.

18 Claims, 6 Drawing Sheets

ND cooling ceiling

BACKGROUND OF THE INVENTION

1. Field of the Invention

The invention relates to a ceiling element for a heating and cooling ceiling, having a ceiling panel and a line which is guided on the ceiling panel, and is intended for a heat transfer medium where the line is formed by a hose made of a flexible material, and at least one guide is provided on the upper side of the ceiling panel, which guide is intended for receiving the hose, and in which the hose is guided with a specially formed cross-section.

2. Description of Related Art

Various configurations of such ceiling elements are known, which can be used for heating ceilings, cooling ceilings and ceilings which are intended for both heating and cooling. This can be gathered, for example, from H. Sokolean: "Kühldeckentechnologie zur Erreichung des bestmöglichen Raumkomforts" (Cooling-ceiling technology for achieving the best possible comfort in a room) in Architektur und Technik August 1992, pages 49–53, B+L Verlag AG, Schlieren (Switzerland).

According to a first configuration described therein, the ceiling element, including a pipe for channelling a heat transfer medium, usually water, is extruded from aluminum. Although such ceiling elements fulfil high requirements as far as the heat transfer between transfer medium and ceiling panel is concerned, they are comparatively high in cost to produce. Moreover, the pipes are susceptible to corrosion if water is used as the heat transfer medium, with the result that an inner pipe made of copper or steel often has to be drawn in. This increases the material and production costs considerably.

According to a second configuration, the ceiling element, including a tub-shaped receiving means in which a copper or steel pipe is laid, is likewise extruded from aluminum. Here too, as a result of the pipe, the material costs are high.

In a further configuration, thin plastic hoses are laid in a comparatively closely arranged manner on the upper side of the ceiling panel. Here, without additional measures which improve the thermal contact, but also increase the production outlay, the heat transfer between the plastic hoses and the ceiling panel is, as a result of the small contact surface area, unsatisfactory.

SUMMARY OF THE INVENTION

The object of the invention is to provide a ceiling element of the abovementioned type, which can be produced simply and cost-effectively, particularly because it does not require any expensive materials, and because it ensures good heat conduction between the heat transfer medium and the ceiling panel.

In addition to inexpensive production and the high efficiency of the ceiling element, as well as the avoidance of corrosion problems such as those which can occur if inappropriately treated water is used as the heat transfer medium, the advantages which are achieved by use of the ceiling element of the invention also lie in the fact that the ceiling element can be connected very easily and can be joined to adjacent ceiling elements of an identical or different type of construction.

The invention is explained in more detail below with reference to figures, which merely represent exemplary embodiments, and in which:

BRIEF DESCRIPTION OF THE DRAWINGS

FIG. 11b shows a top plan view of a corner region of the ceiling element of FIG. 11a.

DESCRIPTION OF THE PREFERRED EMBODIMENTS

All the ceiling elements each include a rectangular ceiling panel 1 as well as a hose 2 which is intended for channelling a heat transfer medium and is guided in a longitudinal direction in a rectilinear guide which is in close thermal contact with the ceiling panel 1.

Figure 1A:
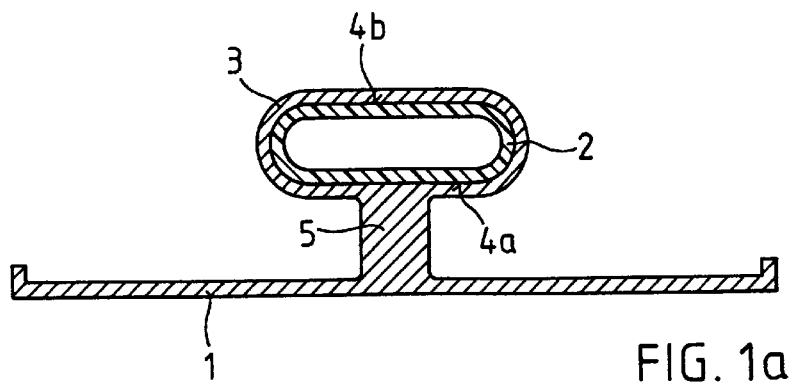
FIG. 1a shows a cross-section, taken on line 1a—1a of FIG. 1b, through a first embodiment of the ceiling element according to the invention.
Figure 1B:
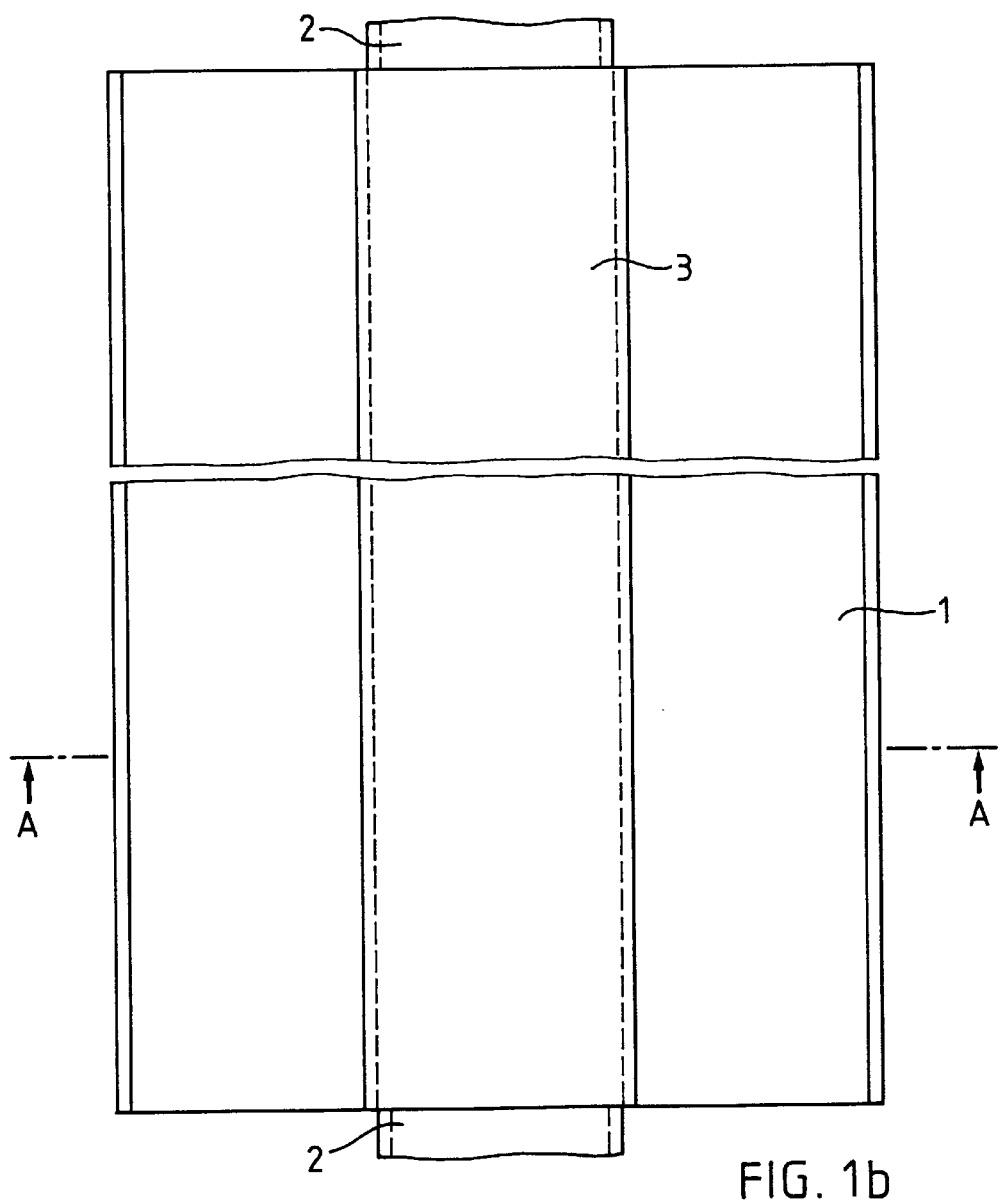
FIG. 1b shows a top plan view of the ceiling element of FIG. 1a, FIG. 2a shows a cross-section, taken on line 2a—2a of FIG. 2b, through a second embodiment of a top ceiling element according to the invention.

In the case of the first embodiment (FIGS. 1a, 1b), the guide is designed as a closed duct which is formed by a pipe 3 and of which the cross-section is oval, the longitudinal walls forming parallel, planar contact walls 4a,b which run parallel to the ceiling panel 1. The pipe 3 is joined to the ceiling panel 1 by a web 5 which ensures good thermal contact. Since it is possible to grip beneath the pipe 3, the ceiling element can be conveniently mounted. The ceiling panel 1, the web 5, and the pipe 3 are extruded in one piece from aluminum. The hose 2 is introduced subsequently.

The hose 2, which is of a round cross-section when not deformed and is made preferably of a flexible plastic which is resistant at least between 10° C. and 60° C., preferably of polyurethane or polybutylene, is clamped between the contact walls 4a, b and thereby deformed elastically. It thus presses against the contact walls 4a, b, this ensuring in each case good contact over the entire surface area and a correspondingly good heat transfer. The hose 2 is also in contact, by means of the remaining part of its surface, with the inner surface of the pipe 3, with the result that the heat transfer between hose and pipe is optimum.

Since a hose can be drawn through the guides of a plurality of ceiling elements and beyond these to connections of supply and discharge lines, complicated connections, susceptible to the formation of leakages, on the ceiling elements are not necessary. Mounting is simplified considerably.

Figure 2A:
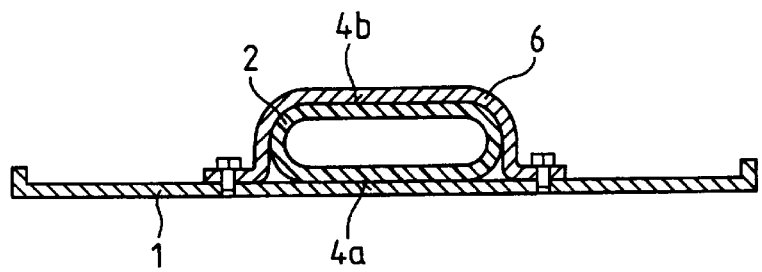
FIG. 2b shows a plan view of the ceiling element of FIG. 2a, FIG. 3 shows a cross-section through a third embodiment of the ceiling element according to the invention.
Figure 2B:
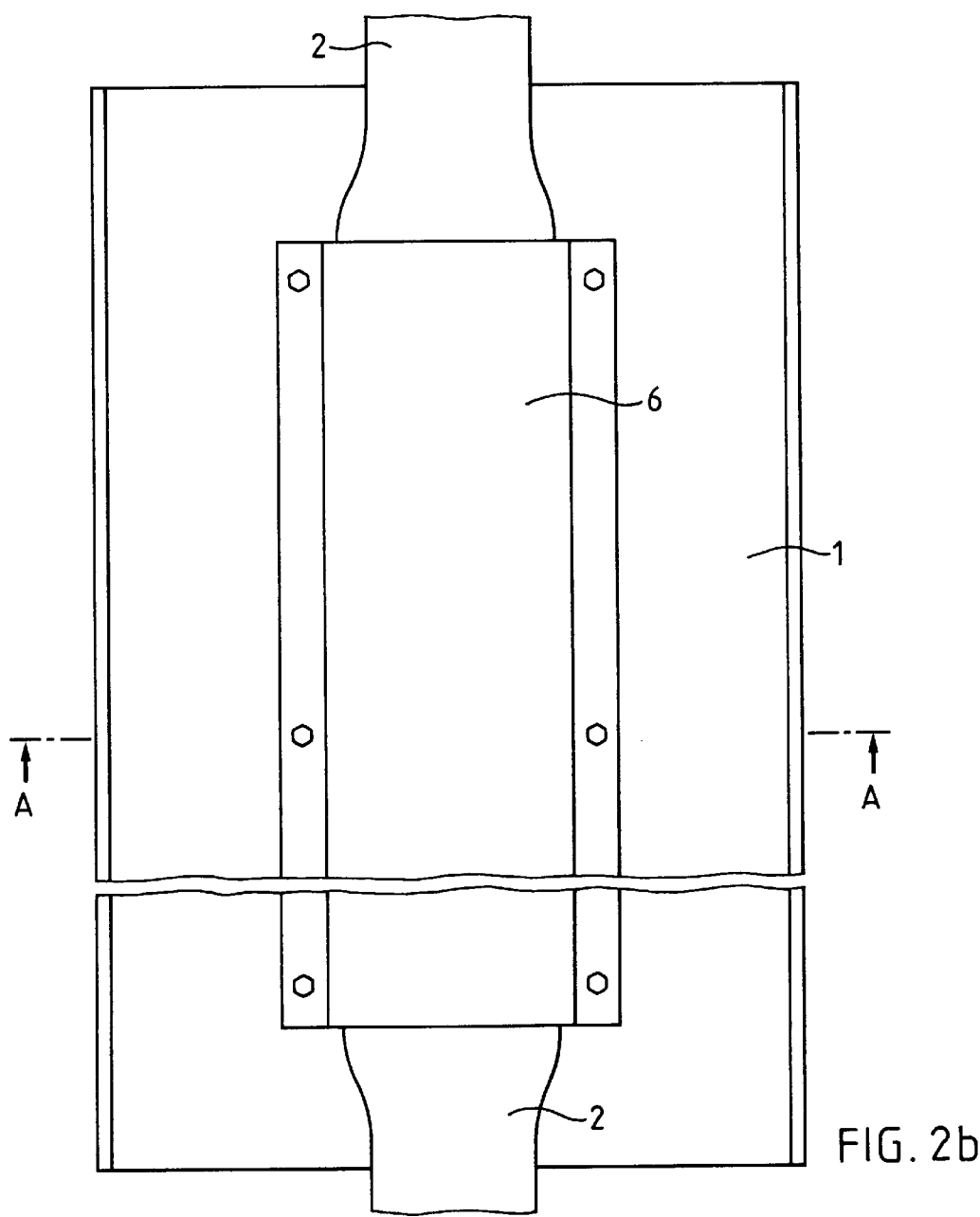

In the case of the second embodiment (FIGS. 2a, 2b), the duct in which the hose 2 is guided is formed by a strip of the upper side of the ceiling panel 1 and by a guide plate 6 which is screwed to the ceiling panel 1 on both sides of the hose 2. The strip and the underside of the guide plate 6 form the contact walls 4a, b, between which the hose 2 is clamped. Thermal contact between the hose 2 and the ceiling panel 1 is optimum, here, as a result of the direct contact, and is further improved by the guide plate 6, which completely encloses the hose 2 and is in close thermal contact with the ceiling panel 1.

The guide plate 6 does not extend over the full length of the ceiling element, thus making it easier to draw-in the hose 2.

Figure 3:
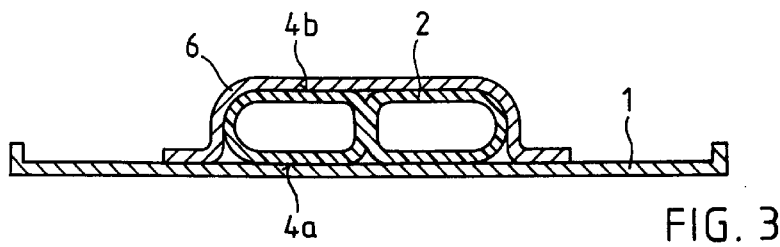

The third embodiment (FIG. 3) substantially corresponds to the second embodiment. The duct is somewhat wider and the hose 2 is designed as a double hose, of which the parts are separated outside the duct and can be drawn-up to various connections, of which one is joined to a cooling unit and the other is joined to a heating unit. Instead of a double hose, provision may also be made, of course, for two single hoses, which are guided in one duct, or else in two ducts, separated, for example, by a partition wall.

Figure 4:
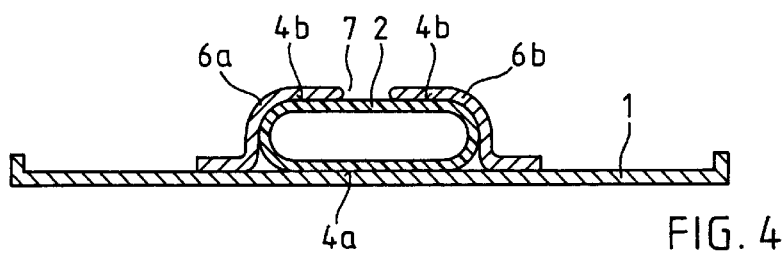
FIG. 4 shows a cross-section through a fourth embodiment of a ceiling element according to the invention.

In the case of the fourth embodiment (FIG. 4), the guide is designed as an upwardly opening groove having a slit 7 in the center, which slit is situated between two identical and symmetrically arranged guide plates 6a, b, which each engage over the hose 2 in part. The slit 7 is of such dimensions that the hose can be forced, through the slit, into the groove, in a laterally compressed state, the hose then adapting itself to the shape of the groove. The heat transfer is usually only slightly impaired by the slit 7, but the introduction of the hose 2 is facilitated considerably.

Figure 5:
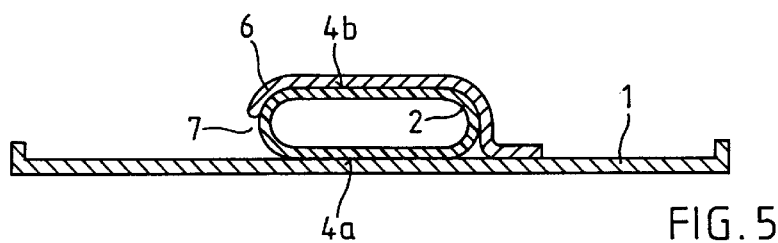
FIG. 5 shows a cross-section through a fifth embodiment of a ceiling element according to the invention.

The fifth embodiment (FIG. 5) constitutes a modification of the fourth embodiment, in the case of which fifth embodiment the guide plate 6 engages over the hose 2 virtually completely, with the result that the slit 7 is formed laterally between the border of the guide plate 6 and the ceiling panel 1.

Figure 6A:
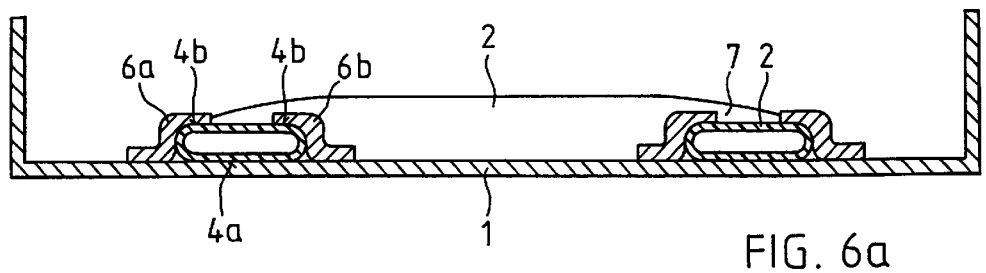
FIG. 6a shows a cross-section, taken on line 6a—6a of FIG. 6b, through a sixth embodiment of the ceiling element according to the invention.
Figure 6B:
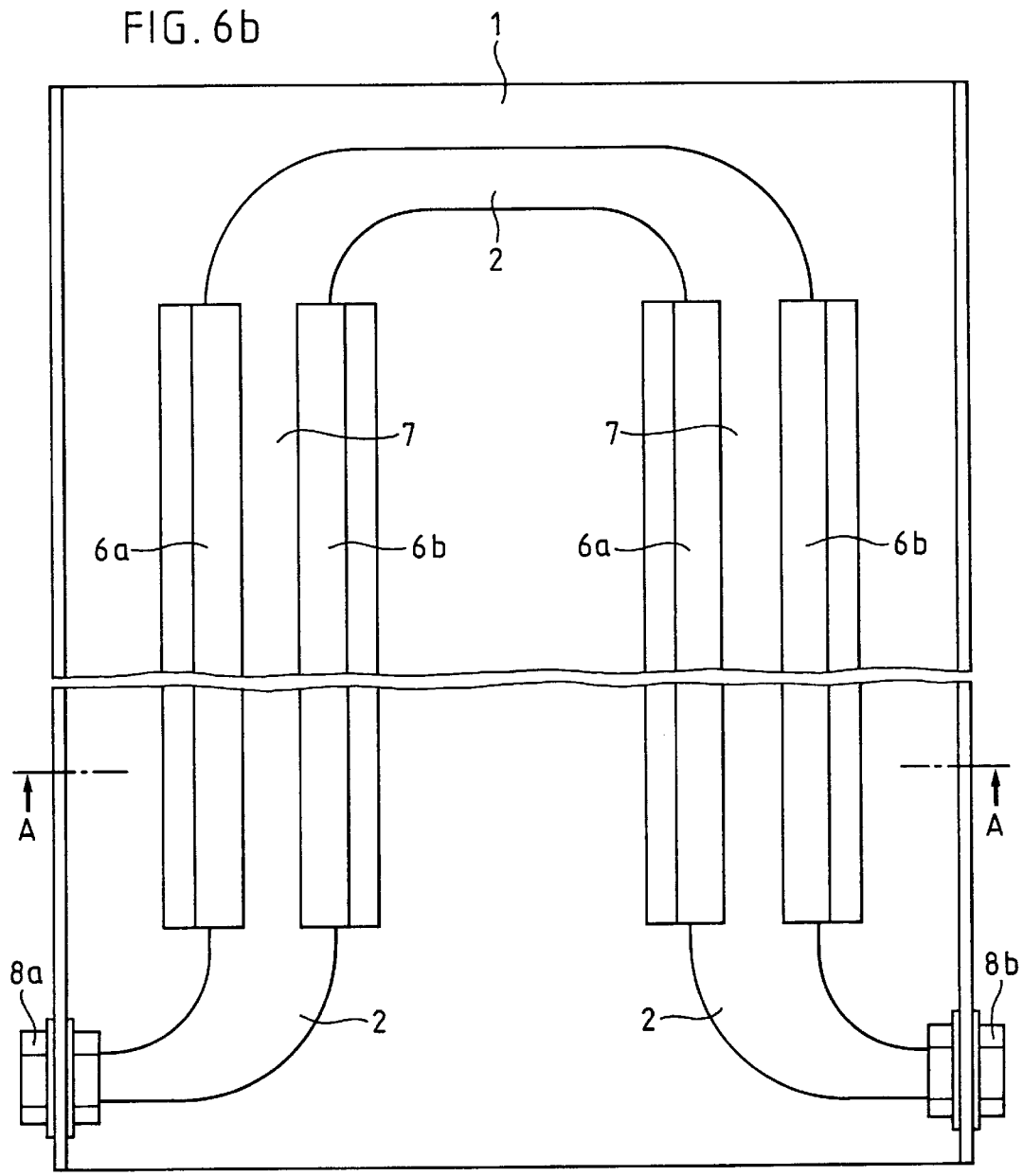
FIG. 6b shows a top plan view of the ceiling element of FIG. 6a, FIG. 7 shows a cross-section through a seventh embodiment of a ceiling element according to the invention.

In the case of the sixth embodiment (FIG. 6a, 6b), provision is made for two parallel guides designed as grooves formed by two guide plates 6a, b, similarly to the fourth embodiment. The guides do not extend over the entire length of the ceiling element, with the result that it is possible not only for the hose 2 to be drawn in in a very convenient manner, but also for it to be guided in a flexible manner. The hose may, as represented, run through the two guides one after the other and, on both sides, be drawn up to connections 8a, b, which may be designed as, for example, bulkhead stuffing boxes. However, it may also, in the case of low local heating and cooling requirements, run through only one guide, and be drawn through to the adjacent ceiling element on one or both sides.

Figure 7:
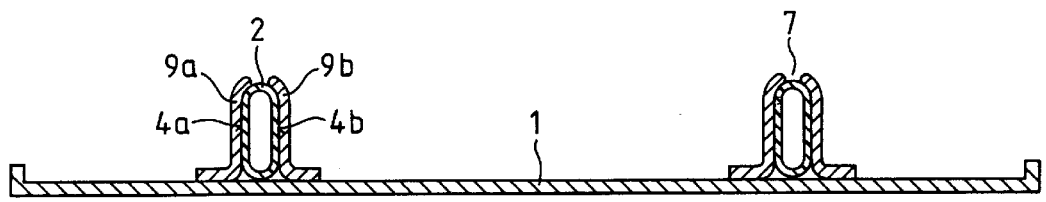

In the case of a similar seventh embodiment (FIG. 7), the grooves are narrow and deep and are each formed by parallel guide webs 9a, b, of which mutually facing side surfaces form contact surfaces 4a, b, which are perpendicular with respect to the ceiling panel 1. The slit 7 is virtually of the same width as the groove—the webs 9a, b are bent slightly inward at the upper end—with the result that the hose 2 can be drawn-in particularly easily. Nevertheless, the hose 2 is virtually completely enclosed, with the result that thermal contact with the ceiling panel 1 is very good.

Figure 8:
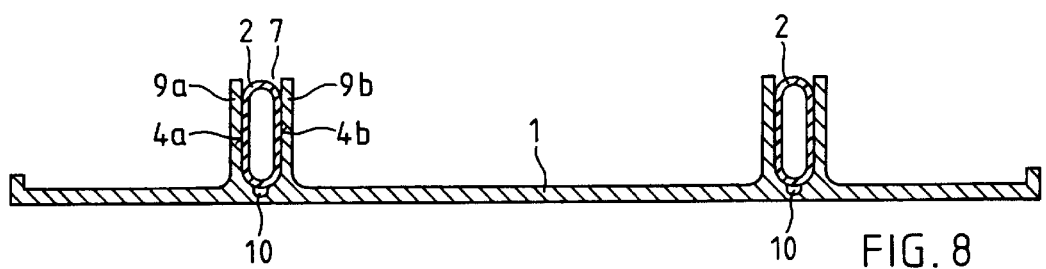
FIG. 8 shows a cross-section through an eighth embodiment of a ceiling element according to the invention.

The eighth embodiment (FIG. 8) corresponds virtually completely to the seventh embodiment. The grooves extend over the entire length of the ceiling element, which has been extruded in one piece, and are rounded at the lower end, with the result that here, too, the hose 2 is substantially in abutment. For the rest, the guide webs 9a, b are straight, with the result that the slit 7 is of the same width as the groove. Additionally provided on the base of the groove is a continuous venting channel 10, which ensures that an air cushion, which obstructs the heat transfer, cannot form between the hose 2 and parts of the contact surfaces 4a, b. Venting channels of this type may also be provided in the case of the other configurations.

Figure 9:
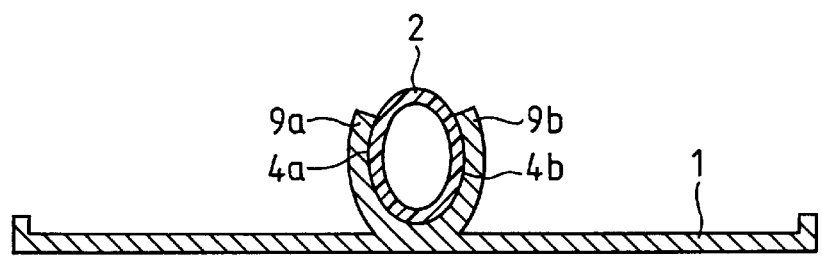
FIG. 9 shows a cross-section through a ninth embodiment of a ceiling element according to the invention.

The ninth embodiment (FIG. 9) shows a groove which is of elliptical cross-section and is formed by two guide webs 9a, b, which are co-extruded with the ceiling panel 1.

Figure 10:
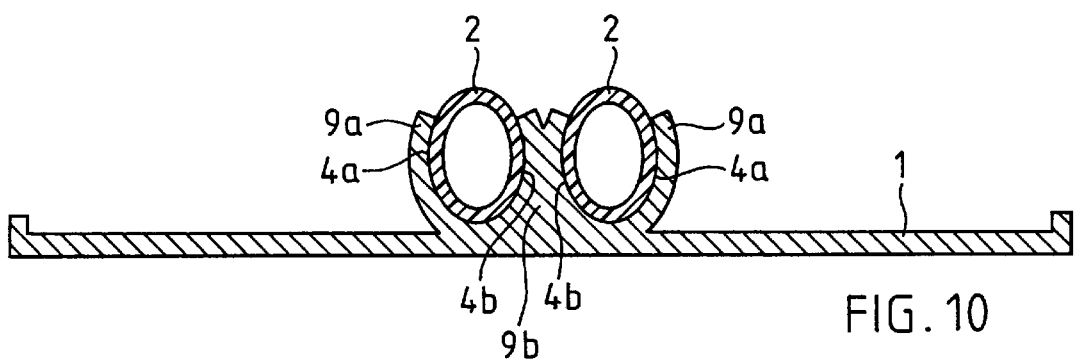
FIG. 10 shows a cross-section through a tenth embodiment of a ceiling element according to the invention.

The tenth embodiment (FIG. 10) shows a double groove. The two grooves, which run directly one beside the other, are of an elliptical cross-section and are formed by two outer guide webs 9a and a central guide web 9b.

Figure 11A:
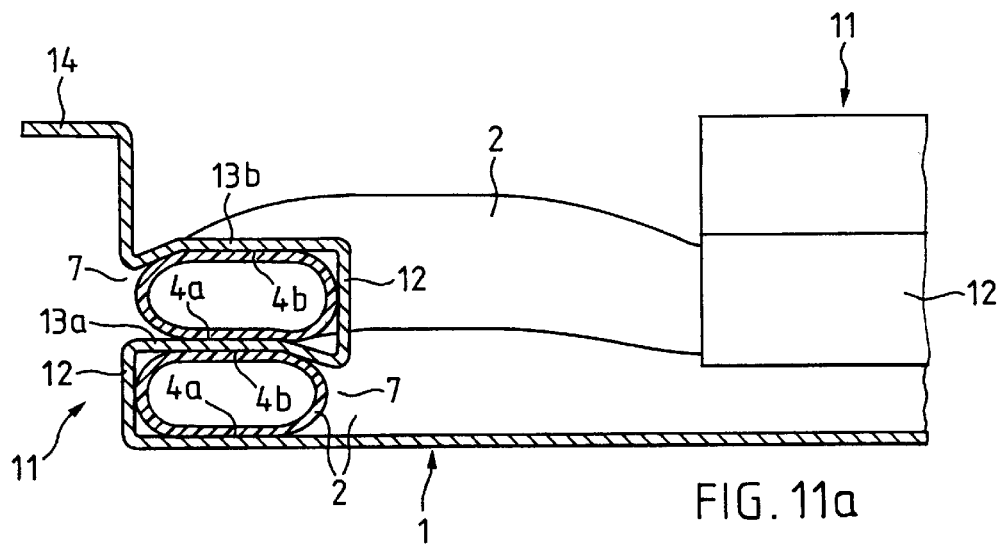
FIG. 11a shows a cross-section, taken on line 11a—11a of FIG. 11b, through the border region of an eleventh embodiment of a ceiling element according to the invention.
Figure 11B:
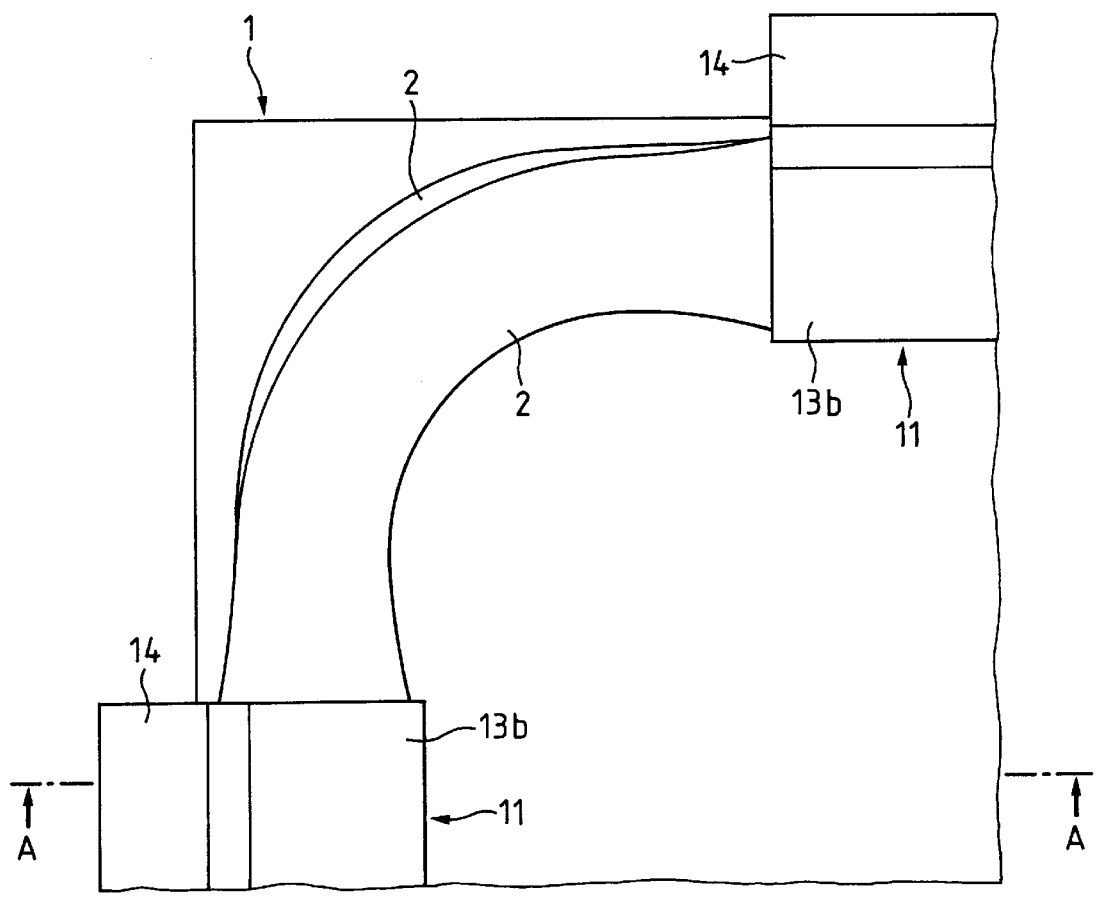

The eleventh embodiment (FIGS. 11a, 11b), finally, is particularly distinguished in that it can be produced very easily and inexpensively. The rectangular ceiling panel 1 includes a peripheral flange 11 which is interrupted in the corner regions and is produced, in a very simple and cost-saving manner, by bending over continuations of the ceiling panel 1, which is punched from sheet metal, preferably sheet steel. Adjoining the border of the ceiling panel 1, the flange 11 has an upwardly bent vertical joining strip 12 which is adjoined by a first horizontal contact strip 13a, the latter being bent inward. Adjoining the inner border of said contact strip 13a, is a further upwardly bent vertical joining strip 12 and, adjoining this, is a second contact strip 13b, the latter being bent outward. Adjoining the outer border of the contact strip 13b, once again via a vertical joining strip, is an outwardly projecting flange strip 14.

A border strip of the upper side of the ceiling panel 1 and the underside of the first contact strip 13a form contact walls 4a, 4b, between which the hose 2 is clamped, and the same goes for the upper side of the first contact strip 13a and the underside of the second contact strip 13b. In order that the hose 2 is fixed securely, the inner border of the first contact strip 13a and the outer border of the second contact strip 13b are drawn downwards to some extent. A slit 7 remains in each case, however, through which the hose can be introduced.

The ceiling element described can be used very flexibly since hose passages or connections are possible in each of the corners. Depending on foreseeable local requirements in each case, two hoses or only one hose, or even no hoses, may be guided on the various sides of a ceiling element. Use may be made of two different hoses, or else one hose may be guided around the ceiling element twice. Of course, further guides, for example of the types outlined in conjunction with the previously described configurations, may also be provided on the surface of the ceiling panel 1. Variants of the design of the flange—with only one guide or more than two guides, etc.—are, of course, possible.

The ceiling elements shown may, of course, be modified in many ways. Guide plates and webs may thus be integrally formed on the ceiling panel, adhesively bonded or screw-connected to it, or joined to it by spot welding. A plurality of parallel guides, or else guides arranged in a different manner may be provided. Possible materials are aluminum or sheet steel, in particular, also, plastics. The dimensions—width and length of the ceiling panel, diameter and wall thickness of the hose, etc.—may vary over wide ranges and be selected in accordance with the requirements of the respective application. Typical values for the hose are, for example, an external diameter of 12 mm and an internal diameter of 10 mm.

The cross-section of the duct in which the hose is guided or of the corresponding groove may also be modified in many ways. It is crucial that the hose be elastically deformed in cross-section, such that a relatively large part of its outer surface presses against contact walls which, moreover, need not be planar, but may, for example, be slightly concave.

The pressing of the hose against the contact walls may also be achieved or assisted in that the heat transfer medium is kept under a slight static super-atmospheric pressure of, for example, 1 bar, this often being the case anyway in most installations. Under the influence of the super-atmospheric pressure, the hose tends towards a round cross-section and, when the guide prevents it from assuming this shape, is deformed, and at least part of its surface is pressed against the walls of the guide. This is also the case if the hose is not elastic or if its elasticity has diminished as a result of the permanent deformation.

What is claimed is:

1. A ceiling element for a ceiling serving a heat-transfer function, comprising:
   a ceiling panel having a first surface configured to be disposed downwards towards a room, and a second, opposite surface arranged to face upwards, away from the room; said ceiling panel having an outer perimeter;
   at least one hose guide provided for disposing a hose in proximity to said second surface; said hose guide having inner peripheral surface means having a given internal transverse cross-sectional shape and size;
   a hose for conducting heat-transfer fluid; said hose being made of flexible material and having an outer peripheral surface having a given external transverse cross-sectional shape and size when undeformed, said size being substantially equal in area to that of said hose guide internal surface means, but said shape which substantially differs from said shape of said inner peripheral surface of said hose guide internal surface means;
   said hose being flexibly deformed by being received in said at least one hose guide, with said outer peripheral surface of said hose disposed in engaging conformation with said inner peripheral surface of said at least one hose guide;
   said hose having two opposite ends;
   said hose being made of elastically flexible material and being elastically, flexibly deformed by being received in said at least one hose guide.

2. The ceiling element of claim 1, wherein:
   at least one said hose guide comprising two mutually opposite contact wall portions which are parallel to one another and adapted to elastically deform said hose therebetween.

3. The ceiling element of claim 2, wherein:
   said contact wall portions are provided on a peripherally continuous structure which defines a peripherally continuous duct.

4. The ceiling element of claim 2, wherein:
   said contact wall portions are providing on a peripherally discontinuous structure which defines a slit configured for lateral reception of the hose into said at least one hose guide.

5. The ceiling element of claim 2, wherein:
   said ceiling panel is planar and said contact wall portions are parallel to said ceiling panel.

6. The ceiling element of claim 5, wherein:
   one of said contact wall portions is at least partially defined by a portion of said second surface of said ceiling panel.

7. The ceiling element of claim 4, wherein:
   said ceiling panel is planar and said contact wall portions are perpendicular to said ceiling panel.

8. The ceiling element of claim 1, wherein:
   said at least one hose guide comprises a plurality of hose guides.

9. The ceiling element of claim 8, wherein:
   said hose guides are arranged in series along a curved path.

10. The ceiling element of claim 1, wherein:
    said ceiling panel and said at least one hose guide are made of a material selected from the group consisting of aluminum and sheet steel.

11. The ceiling element of claim 10, wherein:
    said hose is made from an elastic plastic material selected from the group consisting of polyurethane and polybutylene.

12. The ceiling element of claim 1, wherein:
    said hose is made from an elastic plastic material selected from the group consisting of polyurethane and polybutylene.

13. The ceiling element of claim 1, wherein:
    said opposite ends of said hose extend beyond said outer perimeter of said ceiling panel.

14. The ceiling element of claim 1, wherein:
    said ceiling panel comprises a sheet of stock material, and at least one said hose guide comprises a respective, integral, bent portion of said sheet of stock material.

15. The ceiling element of claim 14, wherein:
    said sheet of stock material is made of sheet metal, said ceiling panel is generally rectangular, so as to have four edges; and
    a hose guide comprising a respective said integral, bent portion of said sheet of metal is provided at each of said edges.

16. The ceiling element of claim 15, wherein:
    each said hose guide comprising a respective said integral, bent portion of said sheet of metal is generally S-shaped in transverse cross-sectional shape, so as to each provide two hose-receiving channels one of which opens inwardly and the other of which opens outwardly, respectively in an opposite direction and in a same direction as that faced by said outer perimeter of said ceiling panel.

17. A method for effecting heat transfer through a ceiling of a room, comprising:
    providing as at least a portion of the ceiling of the room a ceiling element which includes:
      a ceiling panel having a first surface configured to be disposed downwards towards a room, and a second, opposite surface arranged to face upwards, away from the room; said ceiling panel having an outer perimeter;

at least one hose guide provided for disposing a hose in proximity to said second surface; said hose guide having inner peripheral surface means having a given internal transverse cross-sectional shape and size;

a hose for conducting heat-transfer fluid; said hose being made of flexible material and having an outer peripheral surface having a given external transverse cross-sectional shape and size when undeformed, said size being substantially equal in area to that of said hose guide internal surface means, but said shape which substantially differs from said shape of said inner peripheral surface of said hose guide internal surface means;

said hose being flexibly deformed by being received in said at least one hose guide, with said outer peripheral surface of said hose disposed in engaging conformation with said inner peripheral surface of said at least one hose guide;

said hose having two opposite ends, and said hose being made of elastically flexible material and being elastically, flexibly deformed by being received in said at least one hose guide; and conducting a heat exchange fluid through said hose at a superatmospheric pressure.

18. The method of claim 17, wherein:

said opposite ends of said hose extend beyond said outer perimeter of said ceiling panel.

\* \* \* \* \*